(12) United States Patent
Cun (10) Patent No.: US 9,056,553 B2
(45) Date of Patent: Jun. 16, 2015

(54) METHODS AND SYSTEMS FOR CHARGING AN ELECTRIC VEHICLE

(71) Applicant: David Wong Cun, Garden Grove, CA (US)

(72) Inventor: David Wong Cun, Garden Grove, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/069,066

(22) Filed: Oct. 31, 2013

(65) Prior Publication Data

US 2015/0120109 A1    Apr. 30, 2015

(51) Int. Cl.
| | |
|---|---|
| B60L 9/00 | (2006.01) |
| B60L 11/18 | (2006.01) |
| B60W 20/00 | (2006.01) |
| H02J 7/16 | (2006.01) |

(52) U.S. Cl.
CPC ............ *B60L 11/1809* (2013.01); *B60W 20/00* (2013.01); *H02J 7/16* (2013.01); *Y02T 10/7088* (2013.01); *Y02T 90/12* (2013.01)

(58) Field of Classification Search
CPC . Y02T 90/12; Y02T 10/7088; Y02T 10/7005; H02J 7/16; B60L 11/1809; B60W 20/00
USPC .............. 701/22, 25, 36; 320/109; 324/427; 180/65.265, 65.27
See application file for complete search history.

(56) References Cited

U.S. PATENT DOCUMENTS

| | | |
|---|---|---|
| 3,904,947 A | 9/1975 | Crews |
| 4,935,642 A | 6/1990 | Obelode et al. |
| 5,369,352 A | 11/1994 | Toepfer et al. |
| 5,596,258 A | 1/1997 | Kimura et al. |
| 5,598,084 A | 1/1997 | Keith |
| 5,684,379 A | 11/1997 | Svedoff |
| 5,939,855 A * | 8/1999 | Proctor et al. ................. 320/104 |
| 5,952,813 A * | 9/1999 | Ochiai ........................... 320/104 |
| 6,046,513 A | 4/2000 | Jouper et al. |
| 7,573,228 B2 | 8/2009 | Karner et al. |
| 8,054,039 B2 | 11/2011 | Bauerle et al. |
| 8,054,048 B2 | 11/2011 | Woody et al. |
| 8,058,848 B2 | 11/2011 | Mitsutani |
| 8,183,826 B2 | 5/2012 | Tuffner et al. |
| 8,232,765 B2 | 7/2012 | Billmaier |
| 8,405,347 B2 | 3/2013 | Gale et al. |
| 2004/0169489 A1* | 9/2004 | Hobbs ........................... 320/104 |
| 2008/0218121 A1 | 9/2008 | Gale et al. |
| 2008/0231230 A1 | 9/2008 | Gale et al. |
| 2009/0234599 A1 | 9/2009 | Watanabe |
| 2010/0082277 A1 | 4/2010 | Ballard |
| 2010/0253290 A1 | 10/2010 | Hammerstrom |
| 2010/0259223 A1 | 10/2010 | Gale et al. |
| 2010/0259227 A1 | 10/2010 | Gale et al. |
| 2010/0259229 A1 | 10/2010 | Gale et al. |
| 2011/0046828 A1 | 2/2011 | Chander et al. |
| 2011/0101915 A1 | 5/2011 | Mitsutani |

(Continued)

*Primary Examiner* — Gertrude Arthur Jeanglaud (74) *Attorney, Agent, or Firm* — Armstrong Teasdale LLP (57) ABSTRACT

A system for use in controlling a charging system for an electric vehicle is provided. The system includes a computing device. The computing device includes a memory device and a processor coupled to the memory device. The processor is configured to store, in the memory device, data relating to at least one charging session of the electric vehicle. The processor is also configured to receive, from a user input device, at least one selection relating to at least one of a charging rate setting and a charging preference setting for controlling a charging rate at which a charger in the electric vehicle draws current from a power supply.

16 Claims, 9 Drawing Sheets

(56) References Cited

U.S. PATENT DOCUMENTS

| | | |
|---|---|---|
| 2011/0127956 A1 | 6/2011 | Mitsutani |
| 2011/0133693 A1 | 6/2011 | Lowenthal et al. |
| 2011/0163716 A1 | 7/2011 | Gale et al. |
| 2011/0166728 A1 | 7/2011 | Gale et al. |
| 2011/0175569 A1* | 7/2011 | Austin .................... 320/109 |
| 2011/0204849 A1 | 8/2011 | Mukai et al. |
| 2011/0273139 A1 | 11/2011 | Hofheinz |
| 2011/0316482 A1 | 12/2011 | Baxter et al. |
| 2012/0025763 A1 | 2/2012 | Hsiao et al. |
| 2012/0078553 A1 | 3/2012 | Kuroda et al. |
| 2012/0081072 A1 | 4/2012 | Gale et al. |
| 2012/0153895 A1 | 6/2012 | Gale et al. |
| 2012/0161702 A1 | 6/2012 | Kim |
| 2012/0161925 A1 | 6/2012 | Gale et al. |
| 2012/0200256 A1 | 8/2012 | Tse |
| 2012/0223675 A1 | 9/2012 | Bianco |
| 2012/0277927 A1 | 11/2012 | Watkins et al. |
| 2012/0286729 A1 | 11/2012 | Yegin et al. |
| 2013/0026985 A1* | 1/2013 | McMullin .................... 320/109 |
| 2013/0041850 A1 | 2/2013 | Lafrance |
| 2013/0057214 A1 | 3/2013 | Stevens |
| 2013/0119947 A1 | 5/2013 | Ishida et al. |
| 2013/0127412 A1 | 5/2013 | Wiese |
| 2013/0257387 A1* | 10/2013 | Yokoyama et al. ........... 320/137 |

* cited by examiner

METHODS AND SYSTEMS FOR CHARGING AN ELECTRIC VEHICLE

BACKGROUND

The field of the disclosure relates generally to vehicles, and more particularly, to methods and systems for use in charging an electric vehicle.

With continuing sales of electric vehicles, such as battery electric vehicles (BEV) and plug-in hybrid electric vehicles (PHEV), there is a demand for charging facilities to facilitate recharging of the vehicles. Such charging facilities include an electric vehicle supply equipment (EVSE) unit that converts electrical energy received from a source of electrical power into a form that can be received by a vehicle for recharging the vehicle batteries. While commercial, dedicated charging stations exist, such commercial charging stations are still limited in number, and the potential exists that the number of electric vehicles in use will increase faster than available capacity of such commercial dedicated charging stations can increase.

At least some known electric vehicles are designed to receive charging power from EVSE units (also referred to as "EVSEs") that are designed for residential use. However, the use of a residential EVSE unit may require modifications to a residential electrical system. In an effort to obviate the need for modification of residential electrical systems, at least some known electric vehicles incorporate EVSEs that are portable or are otherwise external to the electric vehicle (hereinafter collectively referred to as "portable EVSEs"), that enable the vehicle to receive charging currently directly from a residential electrical system, or from other relatively low-rated (e.g., non-industrial and/or non-commercial) electrical systems.

In at least some known electric vehicles that use portable EVSEs to receive power from power sources, the portable EVSE is configured ("rated") to permit a level of current to pass through, that is drawn by a charger within the electric vehicle, wherein the power draw may exceed the capacity of a typical residential wall outlet. Accordingly, an optimal recharging environment includes a dedicated residential electrical circuit that is rated at or above the rating of the portable EVSE unit and/or the charger in the vehicle. However, a dedicated residential circuit rated to supply sufficient current to charge the vehicle may not be available. Furthermore, even if the residential electrical system includes a power supply circuit that is rated at or above the rating of the EVSE unit or the maximum draw of the vehicle charger, if the EVSE unit shares the circuit with another load, such as a television or a refrigerator, it is possible under some conditions that the total demand may exceed the capacity or breaker limit of the electrical circuit, causing the breaker associated with the electrical circuit to trip, interrupting charging of the vehicle and inconveniencing the vehicle owner.

BRIEF DESCRIPTION

In one aspect, a computing device for use in controlling a charging system in an electric vehicle is provided. The computing device includes a memory device. The computing device also includes a processor coupled to the memory device. The processor is configured to store, in the memory device, data relating to at least one charging session of the electric vehicle. The processor is also configured to receive, from a user input device, at least one selection relating to at least one of a charging rate setting and a charging preference setting for controlling a charging rate at which a charger in the electric vehicle draws current from a power supply.

In another aspect, a vehicle is provided. The vehicle includes a propulsion system including an electricity-oriented prime mover. The vehicle also includes a charging system coupled to the propulsion system and coupleable to a residential electrical system. The charging system includes a charger and at least one sensor coupled to the charger. The charging system also includes a computing device coupled to the charger and the at least one sensor. The computing device includes a memory device, and a processor coupled to the memory device, wherein the processor is configured to receive from a user input device at least one selection relating to at least one of a charging rate setting and a charging preference setting for controlling a charging rate at which a charger in the electric vehicle draws current from a power supply.

In another aspect, a computer-based method for use in charging an electric vehicle is provided. The method is implemented using a computing device that includes a processor coupled to a memory device. The method includes coupling the electric vehicle to a power supply. The method also includes receiving, from a user input device coupled to the processor, at least one user selection relating to at least one of a charging rate setting and a charging preference setting for a charger coupled to the processor, wherein the charging rate setting is one of at least a first rate setting and a second, lower rate setting. The method also includes storing, in the memory device, data relating to at least one charging session of the electric vehicle.

In yet another aspect, an electric vehicle supply equipment (EVSE) unit is provided. The EVSE unit includes a user input device and a user display device. The EVSE unit also includes a memory device, and a processor coupled to the user input device, the user display device, and the memory device. The processor is configured to store, in the memory device, data relating to at least one charging session of the electric vehicle. The processor is also configured to receive, from the user input device, at least one selection relating to at least one of a charging rate setting and a charging preference setting for controlling a charging rate at which power from a power supply external to the EVSE unit is channeled to a charger in the electric vehicle.

DETAILED DESCRIPTION

The present disclosure relates to electric vehicles, and more particularly, to electric vehicles that use portable or otherwise external electric vehicle supply equipment ("EVSE") units that facilitate charging of electric vehicles by channeling electrical power received from residential or other low-power electrical systems to charging systems of the electric vehicles. Implementations of methods and systems described herein facilitate controlling a charging rate of an electric vehicle charging system. More specifically, implementations of methods and systems described herein facilitate setting a rate for a charging system to a value that is less than a maximum charging rate to facilitate preventing the charging system, in combination with other loads, from inducing a demand on a residential electrical system that is greater than the capacity of the residential electrical system, thus preventing undesired tripping of circuit protection devices (e.g., circuit breakers, fuses, etc.) and/or other disruptions to the residential electrical system.

Implementations of the methods and systems described herein also facilitate automatic adjustment of the charging rate in response to repeated trips of a circuit protection device in the electrical system from which the vehicle is being charged. The system adjusts the charging rate if a predefined number of trips occurs during a single charging session. Implementations of the methods and systems described herein also facilitate automatic adjustment of the charging rate in response to a sensed temperature of a charging system component, if the sensed temperature of the charging system component exceeds a predefined limit temperature. Implementations of the methods and systems described herein also facilitate automatic adjustment of the charging rate in response to a detected present location of the vehicle, wherein a previously-stored reduced charging rate is applied when the present location of the vehicle is determined to be the same as a location where the stored reduced charging rate was previously applied.

As used herein, an element or method action recited in the singular and proceeded with the word "a" or "an" should be understood as not excluding plural elements or actions, unless such exclusion is explicitly recited. Furthermore, references to "example implementation" or "one implementation" of the present disclosure are not intended to be interpreted as excluding the existence of additional implementations that also incorporate the recited features.

The methods and systems described herein may be implemented using computer programming and/or engineering techniques including computer software, firmware, hardware or any combination or subset thereof, wherein the technical effects may be achieved by performing at least one of the following actions: (a) receiving, from a user input device coupled to a processor, at least one user selection relating to at least one of a charging rate setting and a charging preference setting for a charger in an electric vehicle that is coupled to the processor, wherein the charging rate setting is one of at least a first rate setting and a second, lower rate setting; (b) storing, in a memory device coupled to the processor, data relating to at least one charging session of the electric vehicle; (c) prompting a user, via a display presented on a media output device coupled to the processor, to provide at least one of a charging rate setting selection and a charging preference setting selection via the user input device; (d) determining, with a computing device via a location determining device, for example, a global positioning system (GPS) unit, a present location of the vehicle during a present charging session; (e) comparing the determined present location of the vehicle to a previously-detected location stored in the memory device at which, during a prior charging session, a change from a first rate to a second, lower rate occurred in response to a predefined condition detected by the computing device; and (f) changing, with the computing device during the present charging session, a rate at which the charger draws power from a power supply from the first rate to the second, lower rate applied during the prior charging session, if the detected present location is the same as the previously-detected location.

The technical effects may also be achieved by performing at least one of the following actions: (a) storing, in the memory device, received data relating to detected interruptions in a power supply to which the electric vehicle is coupled; (b) causing the charger to change a rate at which the charger draws power from the power supply from a first rate to a second, lower rate if a number of detected interruptions exceeds a predefined number of interruptions within a single charging session; (c) receiving data regarding a detected temperature of the charger; (d) causing the charger to change a rate at which the charger draws power from the power supply from a first rate to a second, lower rate if the detected temperature of the charger exceeds a predefined limit temperature; (e) determining, during a present charging session, if the at least one battery is fully charged; and (f) terminating the present charging session.

Figure 1:
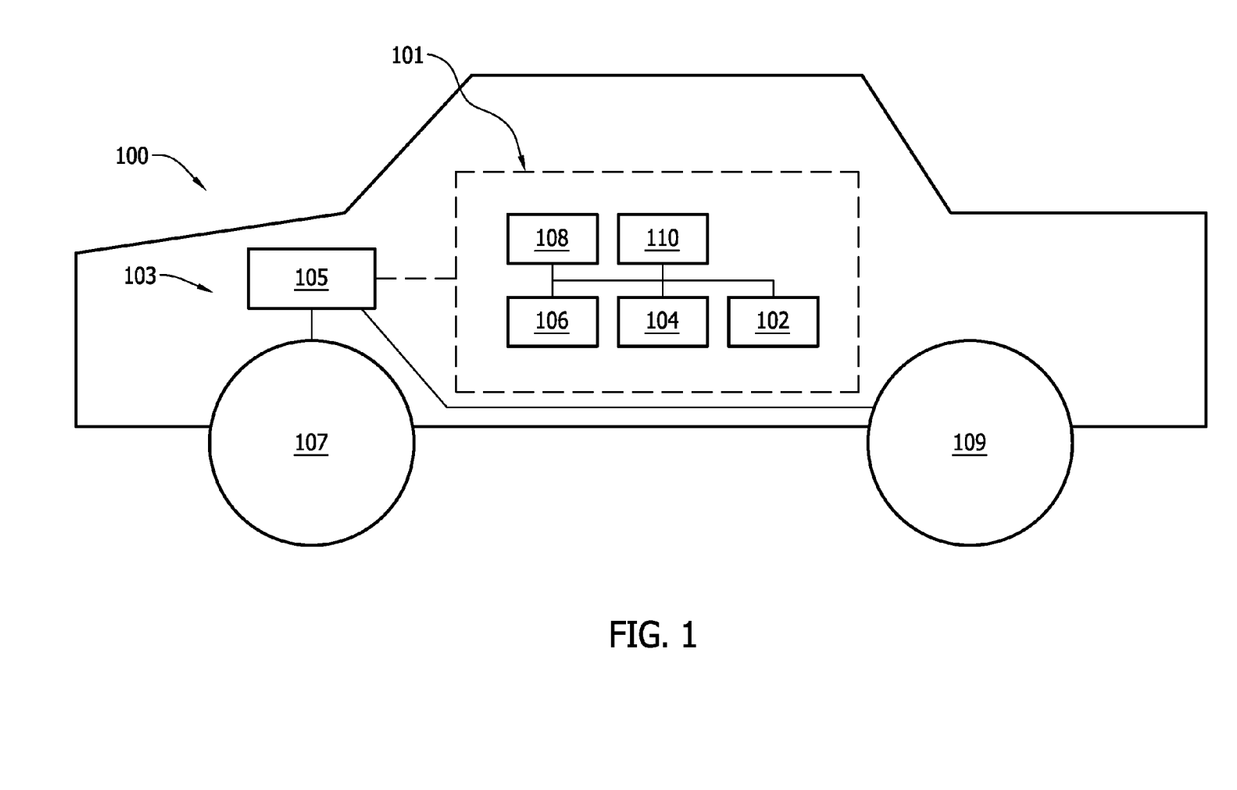
FIG. 1 is a diagram of an exemplary electric vehicle.

FIG. 1 is a diagram of an exemplary embodiment of an electric vehicle ("EV") 100. EV 100 is any vehicle that derives at least a portion of its motive energy from electricity stored in an energy storage device, e.g., a battery that can be charged using power from a source external to the vehicle. Electric vehicle 100 may be, for example, a battery electric vehicle ("BEV") or a plug-in hybrid electric vehicle ("PHEV"). In the exemplary embodiment, electric vehicle 100 includes a charging system 101 that is coupled to an electricity-oriented propulsion system 103. Propulsion system 103 includes a prime mover 105 that is coupled to wheels 107 and 109. In the exemplary embodiment, prime mover 105 is an electricity-oriented source of motive force such as, but not limited to, an electric motor or a fuel-based motor coupled with an electrical generator (not shown). In general, prime mover 105 may be configured in any suitable manner that enables vehicle 100 to function as described herein.

In the exemplary embodiment, charging system 101 includes at least one sensor 102, a battery 104 coupled to a charger 110, a global positioning system ("GPS") device 106, and a computing device 108. Computing device 108 is coupled to sensor 102, GPS device 106, battery 104, and charger 110. In the exemplary embodiment, charger 110 includes at least one electrical power conditioning device (not shown), such as an AC-DC rectifier, for converting alternating current ("AC") received from an electrical power supply (not shown) to direct current suitable for charging battery 104. In addition, charger 110 includes a current flow control device (not shown) coupled to and controlled by computing device 108, for varying an amount of current that charger 110 can receive from an electrical power supply. For example, charger 110 may be configured such that, at a maximum setting of the current flow control device, charger 110 is capable of receiving (or "drawing") an amount of current from an electrical power supply that is greater than the power supply can provide without causing the engagement of a circuit protection device (not shown). In an alternative embodiment, charger 110 may have any suitable configuration that enables charging system 101 to function as described herein. In the exemplary embodiment, sensor 102 is coupled to charger 110. Battery 104 may be configured in any suitable manner than enables vehicle 100 and charging system 101 to function as described herein. For example, in one embodiment, battery 104 is configured as a bank (not shown) of several battery units.

GPS device 106 determines a location of vehicle 100 and, in some implementations, may operate with computing device 108 to provide navigation assistance to a driver (not shown) of electric vehicle 100. In some implementations, GPS device 106 and/or charger 110 are integrated into computing device 108, rather than being physically separate from computing device 108. In the exemplary embodiment, sensor 102 includes at least one temperature sensor (not shown) that is coupled to charger 110 to transmit a signal to computing device 108 that is representative of a temperature of charger 110 during charging of vehicle 100. In an alternative embodiment, sensor 102 may include any number and type of sensors that enables charging system 101 to function as described herein.

Figure 2:
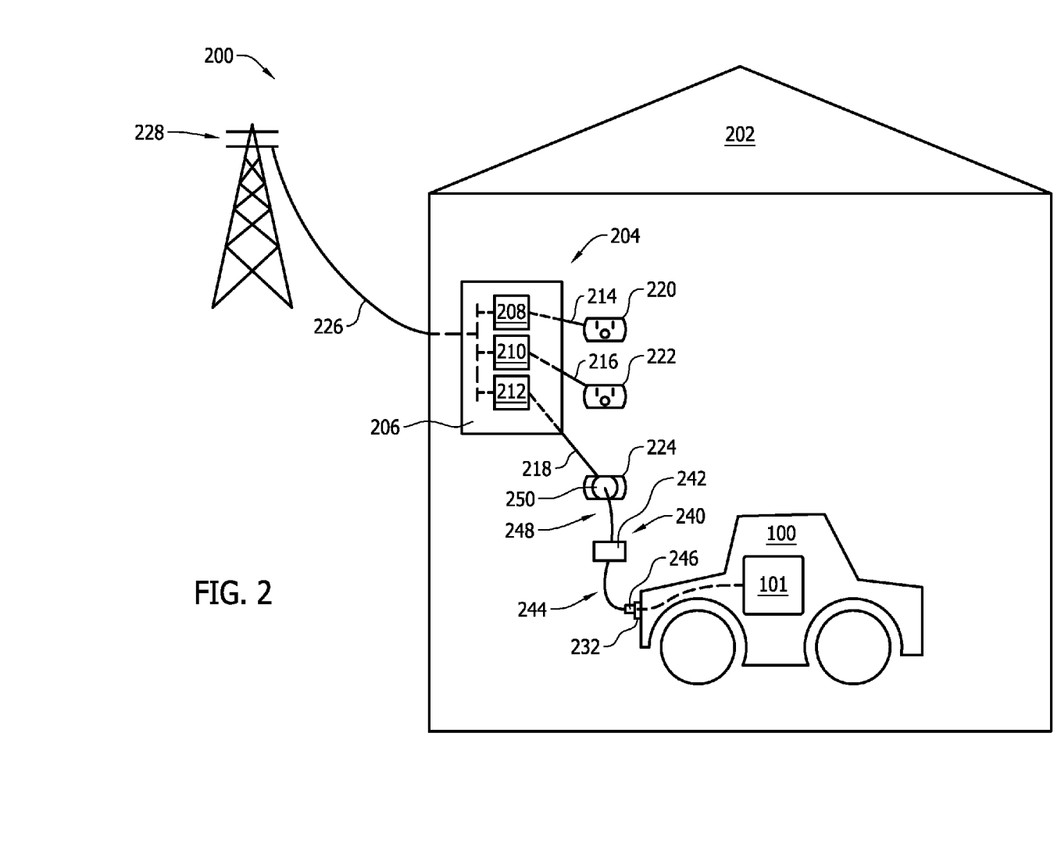
FIG. 2 is a diagram of an exemplary environment including a utility, a residential electrical system, and the electric vehicle shown in FIG. 1.

FIG. 2 is a diagram of an exemplary charging environment 200 that includes vehicle 100, a residence 202, and a power utility 228. A residential electrical system 204 within residence 202 receives electrical power 226 from utility 228 via a power distribution center 206. Power distribution center 206 includes a plurality of circuit protection devices, for example, circuit breakers 208, 210, and 212 that control respective residential electrical circuits 214, 216, and 218. Each electrical circuit 214, 216, and 218 includes at least one electrical outlet, such as outlets 220, 222, and 224. Although three circuit breakers 208, 210, and 212, three electrical circuits 214, 216, and 218, and three outlets 220, 222, and 224 are shown in FIG. 2, in alternative embodiments, environment 200 may include any number of circuit breakers, electrical circuits and/or outlets that enables environment 200 to function as described herein. Although referred to herein as residence 202 and residential electrical system 204, such locations may include retail establishments, businesses, public charging stations, or any other locations where vehicle charging may take place.

Charging system 101 is coupleable to residential electrical system 204, for example, via at least one conductor wire and/or via a wireless power transfer system. In the illustrated embodiment, charging system 101 is coupled to residential electrical system 204 by an electric vehicle supply equipment ("EVSE") unit 240 that enables charging of battery 104 from residential electrical system 204 (shown in FIG. 2). In the exemplary embodiment, EVSE unit 240 includes a contactor box 242, a first connector 244 coupled to contactor box 242 for coupling EVSE unit 240 to vehicle 100, and a second connector 248 coupled to contactor box 242 for coupling EVSE unit 240 to residential electrical system 204. First connector 244 includes a plug device 246 configured for releasable coupling with a receptacle 232, located on vehicle 100, that is electrically coupled to charging system 101. Similarly, second connector 248 includes a plug device 250 that is configured for releasable coupling with outlet 224 of residential electrical system 204. Contactor box 242 includes wiring devices (not shown) configured for facilitating coupling of connectors 244 and 248 with contactor box 242. In addition, in the exemplary embodiment, contactor box 242 includes at least one circuit protection device, such as a circuit breaker or fuse, for terminating current flow through EVSE unit 240, if a current in excess of a predefined amount flows through EVSE unit 240 for a predefined amount of time.

In the exemplary embodiment, second connector 248 of EVSE unit 240 also includes a pilot control line (not shown), that enables charging system 101 to detect what the maximum charging rate is for EVSE unit 240. More specifically, first connector 244 may be configured according to an applicable industry standard, such as SAE J1772, to enable charging system 101 to communicate in a limited manner with EVSE unit 240. In an alternative embodiment, connectors 244 and/or 248 may have any suitable configuration that enables charging system 101 to function as described herein.

In the exemplary embodiment, EVSE unit 240 is configured to permit current to pass therethrough at a maximum pass-through rate or draw of 12 A. As used herein, the pass-through rate may also be referred to as the "charging rate." In an alternative embodiment, EVSE unit 240 may have any maximum charging rate that enables charging system 101 to function as described herein, for example, 15 A or 20 A. In the exemplary embodiment, EVSE unit 240 is capable of permitting current to pass through a substantially continuous range of charging rates up to and including its maximum charging rate.

In the exemplary embodiment, each breaker 208, 210, and 212 permits a maximum ("trip") current to pass therethrough before tripping and cutting power to its associated circuit 214, 216, and 218. For example, if, in the exemplary embodiment, breaker 212 has a trip current value of 15 A, and if a current in excess of 15 A passes through breaker 212, breaker 212 trips, interrupting current in circuit 218. Typically, the greater the current is in excess of the trip current value, the faster breaker 212 will trip. In the exemplary embodiment, charging system 101, via sensor 102, is capable of detecting each circuit breaker trip. In addition, charging system 101, via computing device 108, stores data associated with each instance in which charging system 101 detects a circuit breaker trip, including, but not limited to, data regarding a time and/or date of each trip occurrence, data regarding the current draw by charger 110 at the time of or immediately preceding each trip, and data corresponding to a counter representing a number of breaker trips detected during a charging session.

In the exemplary embodiment, to initiate a charging session to charge vehicle 100, charging system 101 of vehicle 100 is electrically coupled to residential electrical system 204 as described above. As used herein, "charging session" refers to any period of time during which vehicle 100 remains motionless and is continuously coupled to residential electrical system 204. Each instance when charging system 101 detects, via GPS 106, that vehicle 100 is moved, and/or that vehicle 100 is disconnected from residential electrical system 204, is treated by charging system 101 as a termination of a charging session. Accordingly, computing device 108 stores data associated with each charging session. In the exemplary embodiment, charging session data includes, but is not limited to, data associated with a location of vehicle 100 during the charging session, data associated with rate and preference settings selected by a user (not shown in FIG. 2), data associated with rate reductions and/or rate restorations self-applied by charging system 101 as described in further detail herein, data associated with interruptions of current supplied to vehicle 100 by residential electrical system 204 such as by trips of circuit breaker 212, and/or time and date information associated with the initiation and termination of the charging session. The foregoing are merely examples of the types of data that charging system 101 may cause to be stored in memory device 310. In alternative embodiments, charging system 101 may store any data that enables charging system 101 to function as described herein. After charging system 101 stores the charging session data, charging system 101 resets computing device 108 in preparation for receiving and storing data relating to a subsequent charging session.

Figure 3:
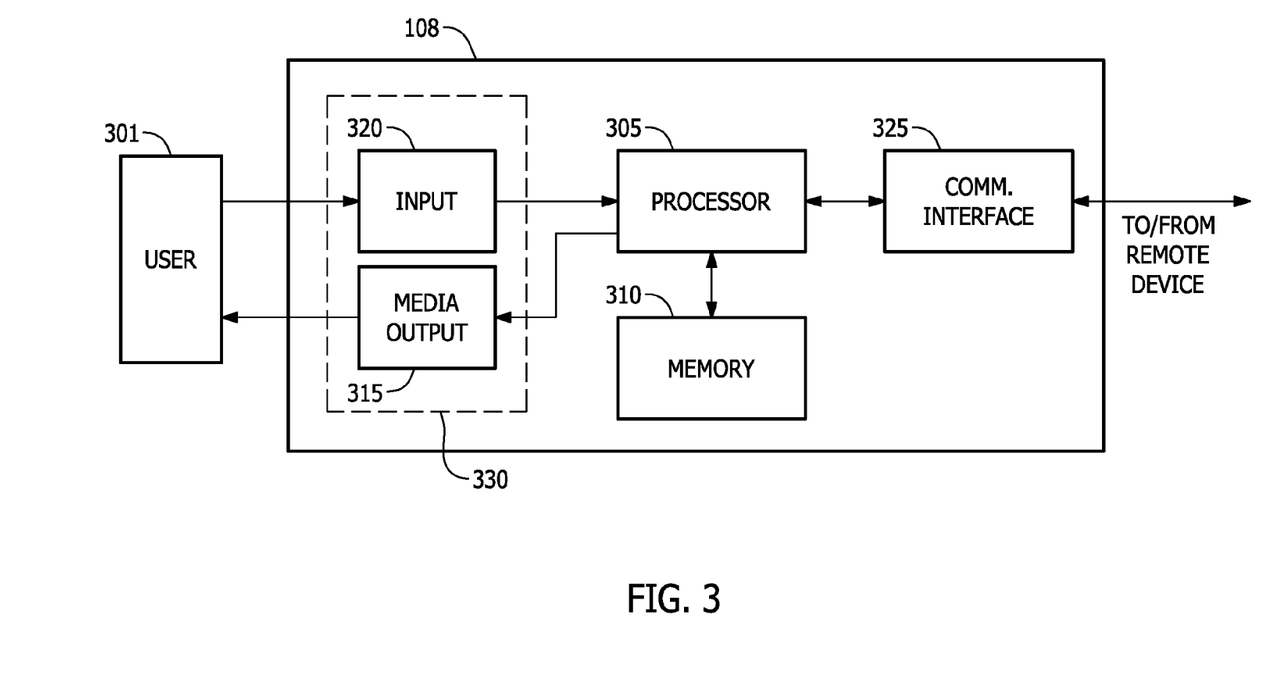
FIG. 3 is a block diagram of an exemplary configuration of a computing device that may be used in a charging system used with the vehicle shown in FIG. 2.

FIG. 3 is a block diagram of an exemplary embodiment of computing device 108 (shown in FIG. 1). In the exemplary embodiment, computing device 108 includes a processor 305 for executing instructions. In some embodiments, executable instructions are stored in a memory device 310. Processor 305 may include one or more processing units (e.g., in a multi-core configuration). Memory device 310 is any device allowing information such as executable instructions and/or other data to be stored and retrieved. Memory device 310 may include one or more computer-readable media.

Computing device 108 also includes at least one media output device 315 for presenting information to a user 301. Media output device 315 is any component capable of conveying information to user 301. In some embodiments, media output device 315 is a video display. In some embodiments, media output device 315 includes an output adapter such as a video adapter and/or an audio adapter (not shown). The output adapter is operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, computing device 108 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen 330 may function as both an output device of media output device 315 and input device 320.

Computing device 108 may also include a communication interface 325, which is communicatively coupleable to a remote device (not shown). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory device 310 are, for example, computer-readable instructions for providing a user interface to user 301 via media output device 315 and, optionally, receiving and processing input from input device 320. A user interface may include, among other possibilities, a web browser and client application. Web browsers enable users, such as user 301, to display and interact with media and other information typically embedded on a web page or a website from server system (not shown).

In the exemplary embodiment, computing device 108 regulates functions of charger 110, such that upon receipt of input selections from user 301, computing device 108 performs functions such as, but not limited to, (1) regulating an amount of current drawn by charger 110 through EVSE unit 240 from a residential electrical system 204 (shown in FIG. 2) to one of at least two different charging rates; (2) automatically changing the amount of power drawn by charger 110 from a higher charging rate to a lower charging rate if computing device 108 detects, via sensor 102, whether a predefined number of current cut-offs ("trips") occurs during a single charging session of vehicle 100; (3) automatically changing the amount of power drawn by charger 110 from a higher charging rate to a lower charging rate if computing device 108 detects, via sensor 102, that a component of charging system 101, specifically charger 110, has reached a temperature in excess of a predefined limit temperature; (4) automatically restoring a previous charging rate if computing device 108 detects, via sensor 102, that the temperature of the overheating component has dropped below a predefined limit temperature; and (5) automatically storing a location of vehicle 100, as determined by computing device 108 via GPS device 106, at which location computing device 108 caused either of functions (3) or (4) to be performed. Moreover, computing device 108 also implements a corresponding reduction of the charging rate whenever computing device 108 detects that vehicle 100 returns to the stored location. In the exemplary embodiment, computing device 108 enables user 301 to select whether any of functions (3)-(5) are performed automatically by charging system 101. In an alternative embodiment, charging system 101 implements one or more of functions (3)-(5) automatically without providing user 301 the opportunity to de-select one or more of functions (3)-(5). In an alternative embodiment, computing device may also perform functions such as: 1) detecting a maximum charge rate of which EVSE unit 240 is capable, and determining whether a user-selected setting exceeds the maximum charge rate of EVSE unit 240; and 2) detecting via a sensor 102 a temperature at receptacle 232 and controlling the charging rate of charger 110 if the sensed temperature is in excess of a predefined temperature.

In the exemplary embodiment, computing device 108 is suitably programmed, using known programming techniques, to operate a charging system control application stored as computer-executable instructions in memory device 310. More particularly, computing device 108 is configured to support a user application that enables user 301 to set operational parameters and/or to select settings for charging system 101 (shown in FIG. 1). In some embodiments, computing device 108 is coupled to other control systems within vehicle 100, such that after vehicle 100 is powered up, or at least some subsystems (not shown) of vehicle 100 are powered up by user 301, computing device 108 causes media output device 315 to present a sequence of displays, including but not limited to those shown in FIGS. 4-6, on touch screen 330 representing successive screens in a user application for use in controlling charging system 101.

Figure 4:
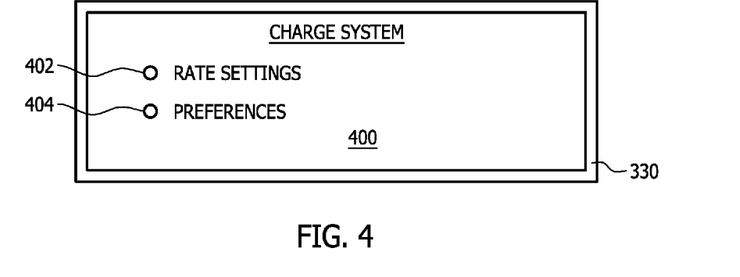
FIG. 4 illustrates an exemplary first screen of a user application for use in controlling the charging system shown in FIG. 2.

For example, FIG. 4 illustrates an exemplary first interactive screen 400 of a user application for use in controlling charging system 101. Computing device 108 causes screen 400 to appear after vehicle 100 is powered up following actuation of a suitable control (not shown) by user 301 (shown in FIG. 3). Screen 400 displays, for example, a radio button 402 that enables user 301 to select "RATE SETTINGS" and a radio button 404 that enables user 301 to select "PREFERENCES." User 301 selects one of buttons 402 and 404, for example, by touching touch screen 330 to cause the selected button to toggle, which may be indicated, for example by a change of color. Alternatively, user 301 may "select" one of buttons 402 and 404 by positioning a cursor (not shown) over the desired selection, e.g., via a mouse button or trackball (not shown) and actuating a physical control, such as an "ENTER" or "OK" button on a keypad (not shown) to confirm the selection. Computing device 108 may then cause touch screen 330 to automatically display a subsequent screen in the user application.

Figure 5:
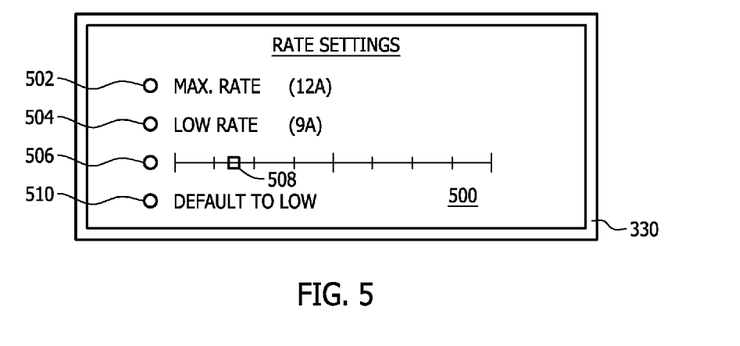
FIG. 5 illustrates an exemplary second screen of the user application shown in FIG. 4.

FIG. 5 illustrates an exemplary second interactive screen 500 of a user application for use in controlling charging system 101. In the exemplary embodiment, computing device 108 causes screen 500 to be displayed after selection by user 301 (shown in FIG. 3) of button 402 (shown in FIG. 4). Screen 500 displays, for example, a button 502 that enables user 301 to select a maximum charging rate, a button 504 that enables user 301 to select a low charging rate, a button 506 that activates a slider 508 that enables user 301 to select a specific charging rate within a range of charging rates, and a button 510 that enables user 301 to select an operating mode in which charging system 101 defaults to a low charging rate each time vehicle 100 is connected to a power supply, such as residential electrical system 204 (shown in FIG. 2).

Figure 6:
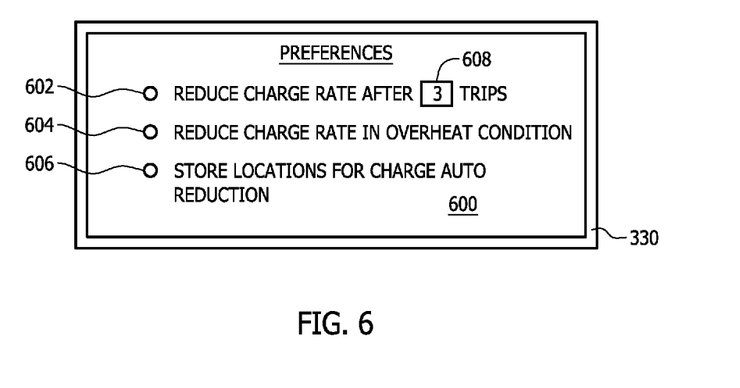
FIG. 6 illustrates an exemplary third screen of the user application shown in FIG. 4.

FIG. 6 illustrates an exemplary third interactive screen 600 of a user application for use in controlling charging system 101. Computing device 108 causes screen 600 to be displayed on touch screen 330 after selection by user 301 (shown in FIG. 3) of button 404 (shown in FIG. 4). Screen 600 facilitates receipt by charging system 101 of charging preference settings selections by user 301. Screen 600 displays, for example, a button 602 that enables user 301 to activate an automatic function wherein computing device 108 causes charging system 101 to reduce the charging rate, e.g., by causing the current flow control device in charger 110 (shown in FIG. 3) to change the rate at which charger 110 draws current from residential electrical system 204 (shown in FIG. 2) via EVSE unit 240 (shown in FIG. 2), after computing device 108 detects, via sensor 102, whether a predefined number of current cut-offs ("trips") occurs during a single charging session.

In the exemplary embodiment, user 301 may enter or select, e.g., via a trackball, mouse, or keyboard (not shown), a number of trips, displayed within a window 608, that must occur within a single charging session before charging system 101 shifts to a lower charging rate. Screen 600 also displays a button 604 that enables user 301 to activate an automatic function wherein computing device 108 causes charging system 101 to automatically change from a higher charging rate to a lower charging rate if computing device 108 detects, via sensor 102, that a component of charging system 101, for example charger 110, has reached a temperature in excess of a predefined limit temperature. Screen 600 also displays a button 606 that enables user 301 to activate an automatic function for storing a location of vehicle 100, as determined by computing device 108 via GPS device 106, at which location computing device 108 applied a reduced charging rate. If computing device 108 determines, during a subsequent charging session, that a present location of vehicle 100 is a stored location, computing device 108 implements a corresponding reduction of the charging rate. In an alternative embodiment, one or more of the functions represented by buttons 602-606 are not selectable by user 301, but rather are automatically applied by charging system 101 each time vehicle 100 is coupled to a power supply, such as residential electrical system 204.

Figure 7:
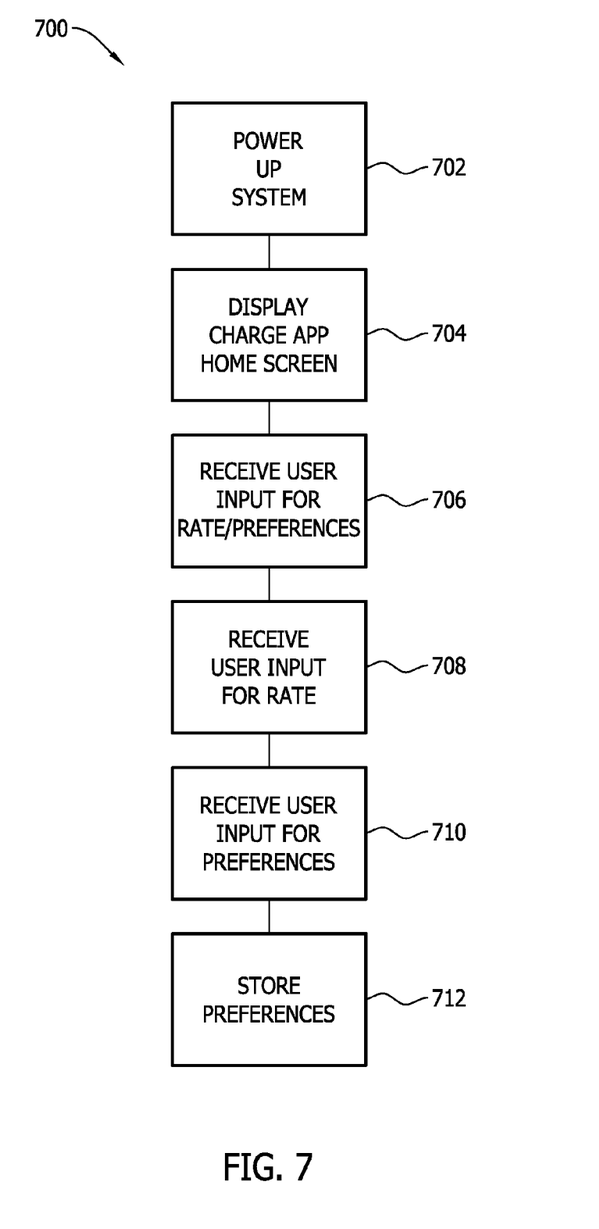
FIG. 7 is a flowchart of an exemplary method that may be used to set up the charging system shown in FIG. 3.

FIG. 7 is a flow chart of an exemplary method 700 for controlling the charging rate of charging system 101 (shown in FIG. 1). Method 700 is initiated when a user powers up 702 charging system 101, such as by actuating a start or ignition switch (not shown) within vehicle 100 (shown in FIG. 1). Charging system 101, via computing device 108 (shown in FIG. 3), causes media output device 315 (shown in FIG. 3) to display 704, e.g., on touch screen 330 (shown in FIG. 3), a charging application home screen such as screen 400 (shown in FIG. 4). Charging system 101 receives 706 input from user 301 (shown in FIG. 3) selecting, for example, "RATE SETTINGS." Charging system 101, via computing device 108, causes media output device 315 to display a second screen 500 (shown in FIG. 5) and receive 708 input from user 301 selecting a rate setting from amongst the options shown in FIG. 5. After receiving 708 charging rate settings from user 301, charging system 101 causes a third screen 600 (shown in FIG. 6) to be displayed on media output device 315 and receive 710 input from user 301 regarding the various preference settings shown in FIG. 6. After charging system 101 has received 706 charging rate settings and received 710 preference settings, charging system 101 stores 712 the settings for application to a future charging session.

Figure 8:
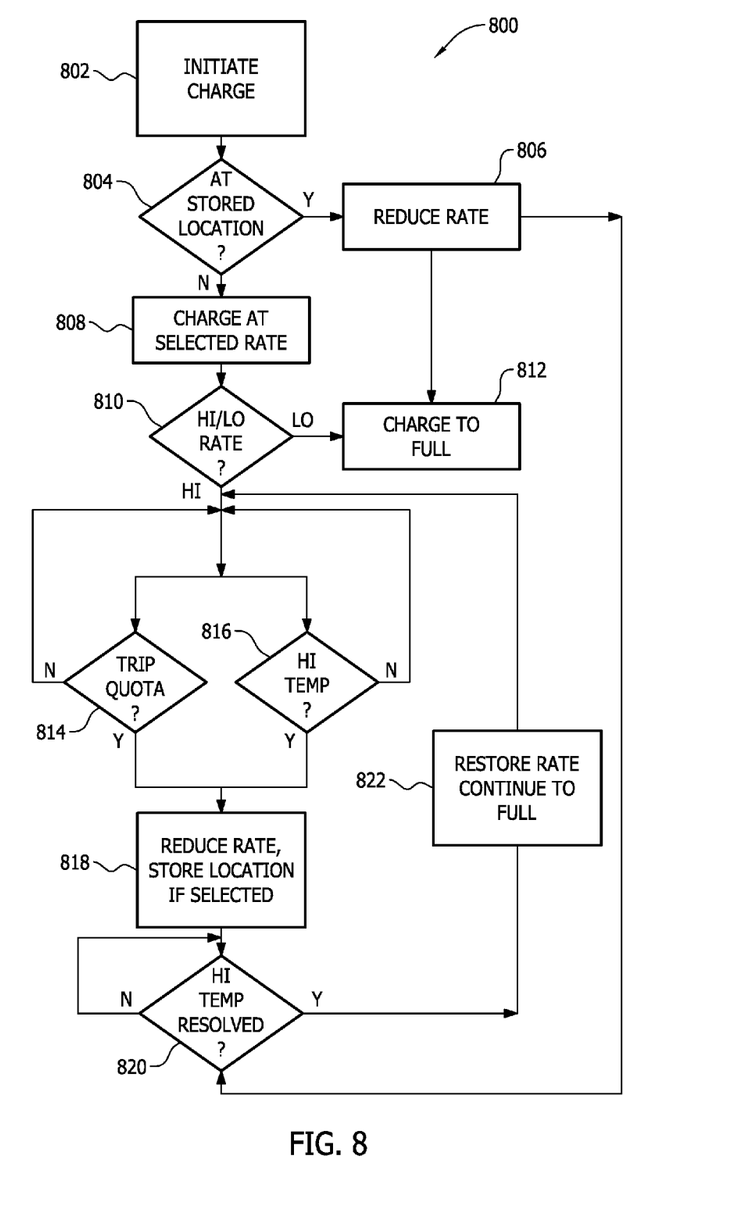
FIG. 8 is a flowchart of an exemplary method that may be used to charge the electric vehicle show

FIG. 8 is a flowchart of an exemplary method 800 for use in charging vehicle 100 (shown in FIG. 1). A user 301 (shown in FIG. 3) initiates 802 charging method 800 by connecting vehicle 100 (shown in FIG. 2) to a power source, for example, residential electrical system 204 (shown in FIG. 2), in any suitable manner, for example by coupling EVSE unit 240 to receptacle 232 of vehicle 100, and to outlet 224 of circuit 218, as shown in FIG. 2. In the exemplary embodiment, charging system 101 (shown in FIG. 1) detects the connection of vehicle 100 to residential electrical system 204, and prompts user 301 to provide input for the rate and preference settings, as shown in FIGS. 4-6. In an alternative embodiment, charging system 101 may receive and store rate and preference settings from user 301 at any time and initiate 802 charging of vehicle 100 according to the stored rate and preference settings, after vehicle 100 is coupled to residential electrical system 204. In the exemplary embodiment, charging system 101 periodically checks a charge status of battery 104. If, at any point in time during the performance of method 800, charging system 101 detects that charging of battery 104 is completed (i.e., a "full" condition), charging system 101 automatically ceases drawing current from residential electrical system 204. In addition, charging system 101 causes media output device 315 to display (not shown) a "battery full" message in any suitable manner that enables charging system 101 to function as described herein.

After initiation 802 of charging method 800, charging system 101, and more specifically, computing device 108 (shown in FIG. 2) and GPS device 106 (also shown in FIG. 2), determine 804 a present location of vehicle 100. System 101 also determines 804 whether the determined present location of vehicle 100 corresponds to a location where charging system 101 previously applied a reduction in charging rate, as described in further detail hereinbelow. In the exemplary embodiment, charging system 101 makes determination 804 by comparing a present location detected by GPS device 106 to a "reduced charge rate" location stored by charging system 101, for example, in memory device 310 (shown in FIG. 3). If charging system 101 determines 804 that vehicle 100 is presently located at a stored location, charging system 101 causes 806 charger 110 (shown in FIG. 1) to draw current from residential electrical system 204 at a reduced rate. In the exemplary embodiment, charging system 101 continues 812 charging at the reduced rate, for example 9 A, until a "battery full" condition is reached. In an alternative embodiment, charging system 101 may determine 820 whether a condition, such as an overheating condition in charger 110, that prompted charging system 101 to store the location is still in effect. In such an alternative embodiment, if the prior overheating condition is still in effect, charging system 101 may continue charging at the previously-established reduced charging rate. If, however, charging system 101 determines 820 that the overheating condition has been resolved, charging system 101 may cause charger 110 to restore 822 charging operations to a "max" or "full" charging rate, for example 12 A.

In the exemplary embodiment, if charging system 101 determines 804 that vehicle 100 is not presently at a location previously stored in memory device 310 as a "reduced rate" location, charging system 101 continues 808 charging vehicle 100 at a rate previously intentionally set by user 301 during implementation of set-up method 700 (shown in FIG. 7). For example, charging system 101 may determine 810 that user 301 initially selected a low charging rate (as shown in FIG. 5). If user 301 is concerned that electrical circuit 218 (shown in FIG. 2) is shared by other loads (not shown) in addition to vehicle 100, user 301 may intentionally select a low charging rate to prevent tripping of breaker 212 (shown in FIG. 2) as a result of a transient overloading of residential electrical system 204 (shown in FIG. 2). If charging system 101 determines 810 that a low charge rate setting is in effect, charging system 101 continues charging 812 to full, as previously described. If, however, charging system 101 determines 810 that user 301 selected a "max" or "full" charging rate, charging system 101 proceeds to charge vehicle 100 at the selected maximum rate, subject to checks 814 and 816 implemented by charging system 101.

Specifically, in the exemplary embodiment, charging system 101 implements status checks 814 and 816, at any predefined intervals that enable charging system 101 to function as described herein, to ensure that appropriate conditions exist for full-rate charging. For example, charging system 101 determines 814 whether any circuit breaker trips have been detected during the current charging session and if so, whether the number of trips has reached the trip quota displayed within window 608 (shown in FIG. 6) previously selected by user 301 (shown in FIG. 3). If charging system 101 determines 814 that circuit breaker trips have occurred and that the trip quota has been reached, charging system 101 reduces 818 the rate at which charger 110 draws current from residential electrical system 204 (shown in FIG. 2) to a lower charge rate. In the exemplary embodiment, charging system 101 also stores the present location of vehicle 100 as a location at which a reduced charging rate was applied, if user 301 previously selected 710 (shown in FIG. 7) storage of location as a preference setting. In addition, in the exemplary embodiment, charging system 101 continues charging at the reduced rate until battery 104 (shown in FIG. 1) is fully charged, or the present charging session is otherwise terminated.

In addition to status check 814, charging system 101 also performs periodic checks, e.g., via sensor 102, of a temperature of a component of charging system 101, such as but not limited to, charger 110. Presuming that a reduced rate has not already been applied, if charging system 101 determines 816 that a predefined limit temperature of charger 110 is exceeded, charging system 101 causes charger 110 to draw current from residential electrical system 204 at a reduced rate, for example 9 A. Because a high-temperature condition may be a self-correcting situation, in the exemplary embodiment, charging system 101 continues to monitor the temperature of charger 110. If charging system 101 determines 820 that the previously-detected high-temperature condition has subsided, charging system 101 causes charger 110 to resume charging at the previously-selected maximum charging rate, if otherwise permitted, until battery 104 is full, the charging rate is reduced by charging system 101 as described above, or the present charging session is otherwise terminated. If, however, charging system 101 determines that the high-temperature condition has not subsided, charging system 101 continues to charge battery 104 at the reduced rate until the high-temperature condition subsides, battery 104 is full, or the present charging session is otherwise terminated.

Figure 9:
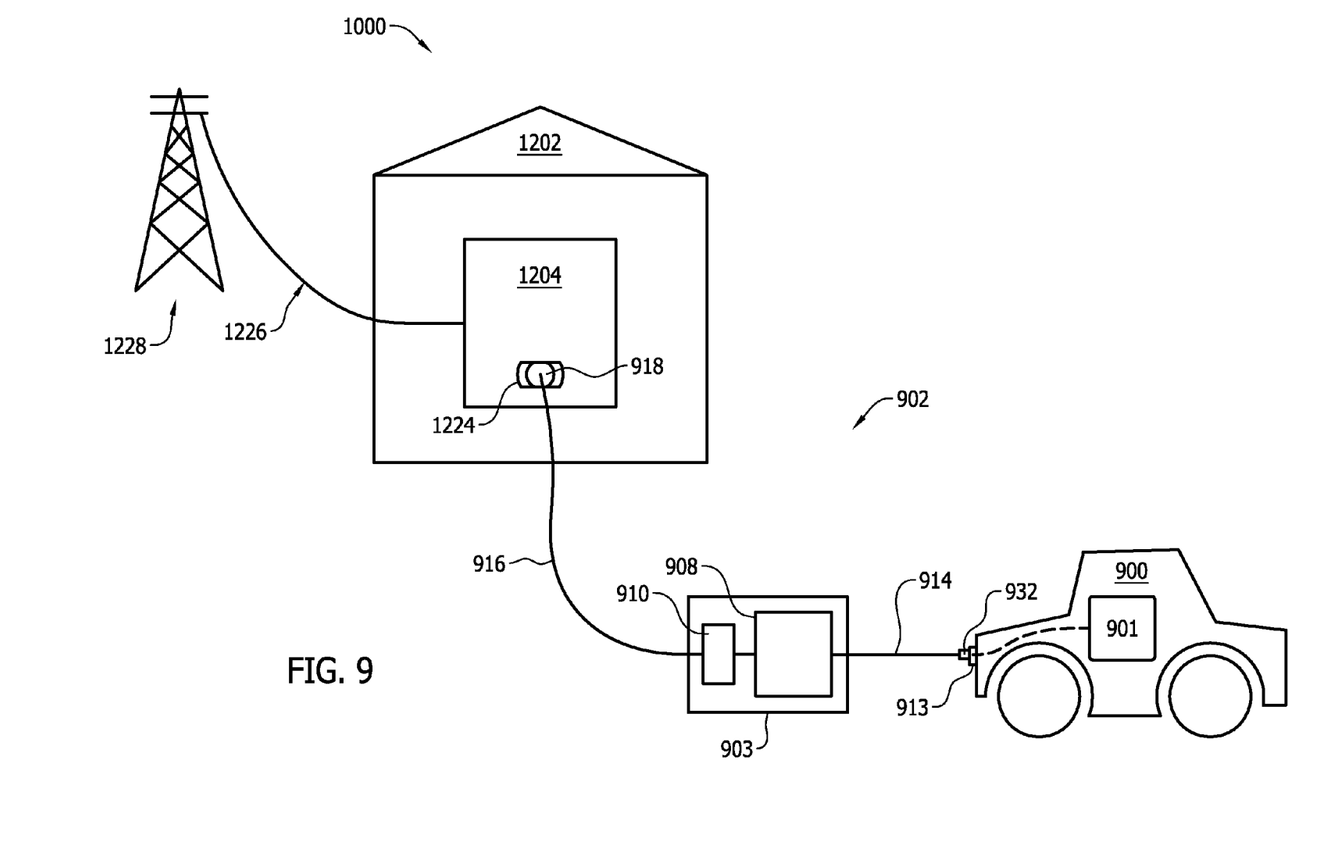
FIG. 9 is a diagram of an exemplary alternative electric vehicle charging environment including a utility, a residential electrical system, an electric vehicle and an exemplary electric vehicle supply equipment (EVSE) unit.
Figure 10:
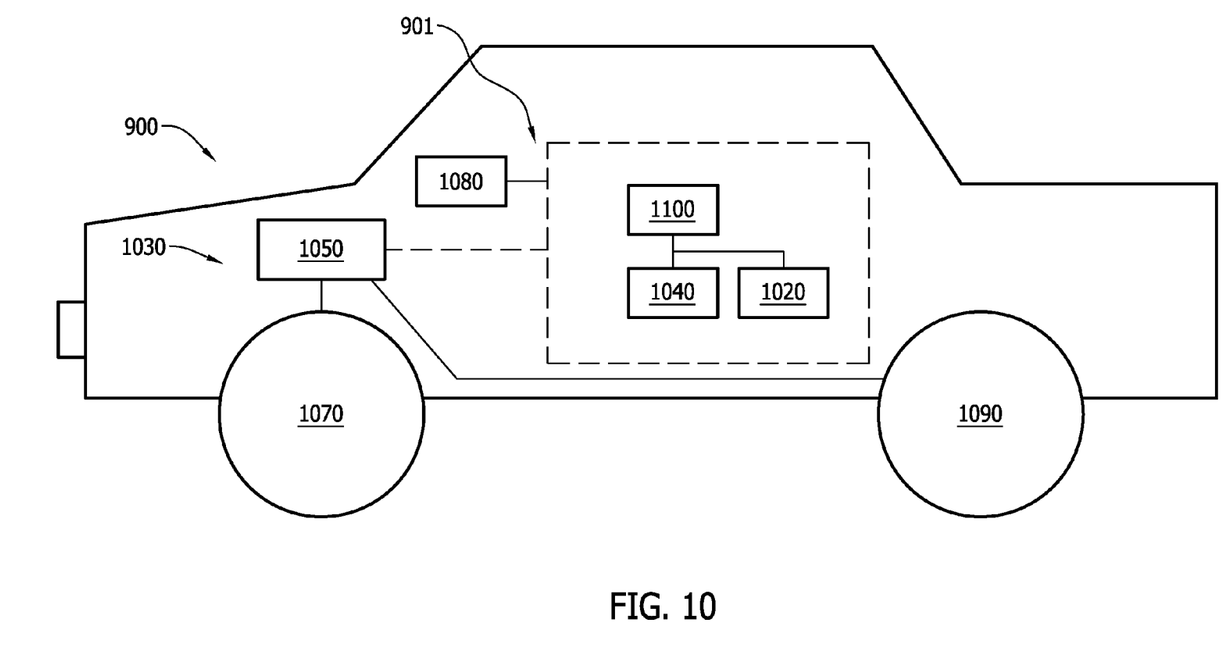
FIG. 10 is a diagram of the electric vehicle shown in FIG. 9.
Figure 11:
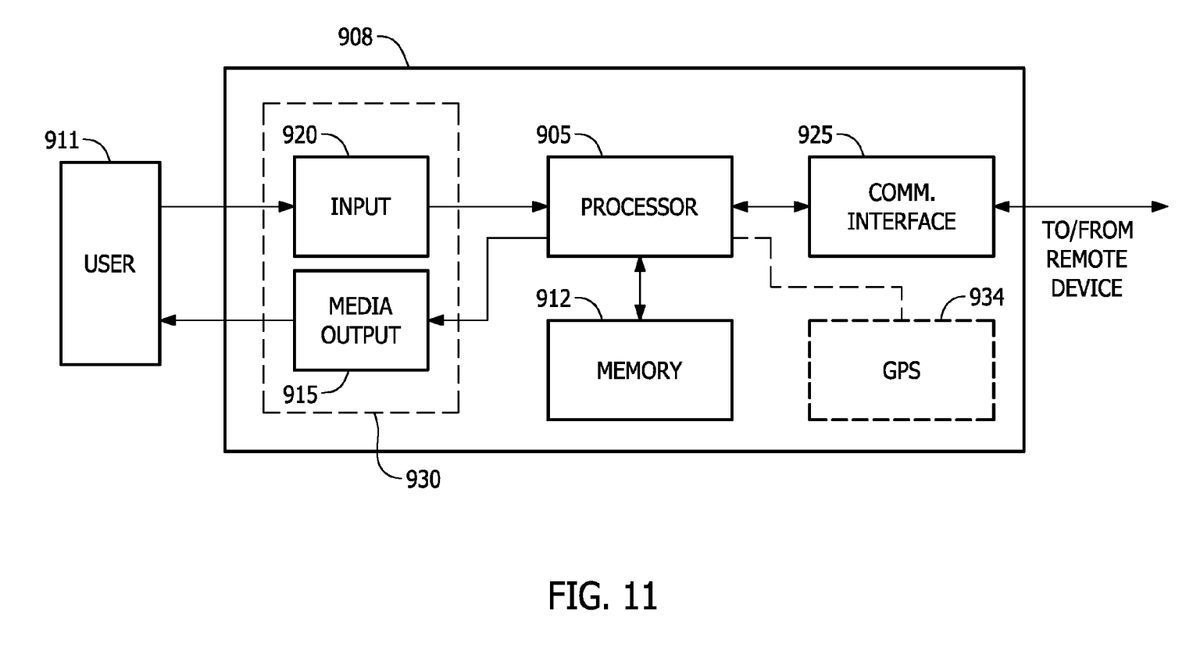
FIG. 11 is a block diagram of an exemplary configuration of a computing device that may be used in the EVSE unit shown in FIG. 9.

In the exemplary embodiment of FIGS. 1-8, command and control functions of charging system 101 are implemented solely within vehicle 100, in cooperation with EVSE unit 240, which is an external (e.g., portable) unit that can be releasably coupled to vehicle 100 for charging. After vehicle 100 has been charged, EVSE unit 240 is then uncoupled from, and, if desired, subsequently transported within vehicle 100. FIGS. 9-11 illustrate, in an alternative embodiment, a portable EVSE unit 902 capable of performing some or all of the command and control functions described hereinabove.

FIG. 9 is a diagram of an alternative exemplary charging environment 1000 that includes a vehicle 900, a residence 1202, and a power utility 1228. A residential electrical system 1204 within residence 1202 receives electrical power 1226 from utility 1228. In the exemplary embodiment, residence 1202 is substantially identical to residence 202 shown in FIG. 2. Accordingly, residential electrical system 1204 is substantially identical to residential electrical system 204 shown in FIG. 2. Although referred to herein as residence 1202 and residential electrical system 1204, such locations may include retail establishments, businesses, public charging stations or any other locations where vehicle charging may take place.

A charging system 901 of vehicle 900 is coupleable to residential electrical system 1204, for example, via at least one conductor wire and/or via a wireless power transfer system. In the illustrated embodiment, charging system 901 is releasably coupled to system 1204 by an electric vehicle supply equipment ("EVSE") unit 902 that enables charging of vehicle 900 from residential electrical system 1204. In the exemplary embodiment, EVSE unit 902 includes a control unit 903 coupled to a first connector 914 for coupling EVSE unit 902 to vehicle 900, and a second connector 916 for coupling EVSE unit 902 to residential electrical system 1204. First connector 914 includes a plug device 913 configured for releasable coupling with a receptacle 932 located on vehicle 900 that is electrically coupled to charging system 901. Similarly, second connector 916 includes a plug device 918 that is configured for releasable coupling with outlet 1224 of residential electrical system 1204.

Control unit 903 includes wiring devices (not shown) configured for facilitating coupling of connectors 914 and 916 with control unit 903. In addition, in the exemplary embodiment, control unit 903 includes at least one current flow control device 910 configured to limit an amount of current that can pass through EVSE unit 902 to a predefined amount. EVSE unit 902 may also include at least one power conditioning device (not shown), such as an AC-to-DC rectifier (not shown), for converting alternating current drawn from residential electrical system 1204 into direct current usable for charging vehicle 900. In the exemplary embodiment, flow control device 910 is coupled to a computing device 908 that, other than being located within control unit 903, is configured substantially similar to computing device 108 (shown in FIG. 3).

FIG. 10 is a diagram of electric vehicle 900 (shown in FIG. 9). In the exemplary embodiment, electric vehicle 900 includes a charging system 901 that is coupled to an electricity-oriented propulsion system 1030. Propulsion system 1030 includes a prime mover 1050 that is coupled to wheels 1070 and 1090. In the exemplary embodiment, prime mover 1050 is an electricity-oriented source of motive force such as, but not limited to, an electric motor or a fuel-based motor coupled with an electrical generator (not shown). In general, prime mover 1050 may be configured in any suitable manner that enables vehicle 900 to function as described herein.

In the exemplary embodiment, charging system 901 includes at least one sensor 1020, a battery 1040 coupled to a charger 1100. In addition, charging system 901 may be coupled to a vehicle computing device 1080, which may be configured similar to computing device 108 (shown in FIG. 3), but which is generally configured for controlling noncharging related functions of vehicle 900. Vehicle computing device 1080 may include a user interface (not shown), that includes a display device and an input device. In the exemplary embodiment, charger 1100 includes at least one electrical power conditioning device (not shown), such as an AC-DC rectifier, for converting alternating current ("AC") received from an electrical power supply (not shown). In addition, charger 1100 includes a current flow control device (not shown) coupleable to and controlled by EVSE unit 902, as described in further detail hereinafter, for varying an amount of current that charger 1100 can receive from system 1204. Battery 1040 may be configured in any suitable manner than enables vehicle 900 and charging system 901 to function as described herein. For example, in one embodiment, battery 1040 is configured as a bank (not shown) of several battery units.

FIG. 11 is a block diagram of an exemplary embodiment of computing device 908 (shown in FIG. 9). In the exemplary embodiment, computing device 908 includes a processor 905 for executing instructions, a memory device 912, at least one media output device 915 for presenting information to a user 911, an input device 920 for receiving input from user 911, and a communication interface 925. Computing device 908 may also include a GPS device 934. A single component such as a touch screen 930 may function as both an output device of media output device 915 and input device 920.

As previously described, computing device 908 is substantially similar to computing device 108 (shown in FIG. 3), and performs similar functions as described within respect to computing device 108. For example, in the exemplary embodiment, computing device 908 is configured to display screens similar to those shown in FIGS. 4-6 on media output device 915 and receive input from user 911 via input device 920. In addition, computing device 908 is configured to communicate with charging system 901, for example, via sensor 1020, to receive signals representative of, for example, a temperature of charger 1100, or a charging status of battery 1040. However, instead of regulating charger 1100 directly by controlling a current flow control device within charger 1100, computing device 908 controls the flow of current into charging system 901 from EVSE unit 902, such that upon receipt of input selections from user 911, computing device 908 performs functions such as, but not limited to, (1) regulating an amount of current supplied to charger 110 through EVSE unit 902 from residential electrical system 1204 (shown in FIG. 9) to one of at least two different charging rates; (2) automatically changing the amount of power supplied to charger 1100 from a higher charging rate to a lower charging rate if computing device 908 detects, via sensor 1020, whether a predefined number of current cut-offs ("trips") occurs during a single charging session of vehicle 900; (3) automatically changing the amount of power supplied to charger 1100 from a higher charging rate to a lower charging rate if computing device 908 detects, via sensor 1020, that a component of charging system 901, specifically charger 1100, has reached a temperature in excess of a predefined limit temperature; (4) automatically restoring a previous charging rate if computing device 908 detects, via sensor 1020, that the temperature of the overheating component has dropped below a predefined limit temperature; and (5) automatically storing a location of vehicle 900, as determined by computing device 908 via GPS device 934 (if present), at which location computing device 908 caused either of functions (3) or (4) to be performed. Moreover, computing device 908 also implements a corresponding reduction of the charging rate whenever computing device 908 detects that vehicle 900 returns to the stored location. In the exemplary embodiment, computing device 908 enables user 911 to select whether any of functions (3)-(5) are performed automatically by EVSE unit 902. In an alternative embodiment, EVSE unit 902 implements one or more of functions (3)-(5) automatically without providing user 911 the opportunity to de-select one or more of functions (3)-(5).

Accordingly, in the exemplary embodiment, after EVSE unit 902 is coupled to vehicle 900 and to system 1204, EVSE unit 902 is capable of performing the functions shown in FIGS. 8 and 9. Computing device 908 may also be configured to communicate with vehicle computing device 1080, such that user 911 can provide input into computing device 908 via an input/display device (not shown) associated with vehicle computing device 1080 within vehicle 900.

In another alternative embodiment (not shown), that is similar to the embodiment of FIGS. 1-8, the functions and structure of EVSE 240 (shown in FIG. 1) are fully incorporated into vehicle 100. In this alternative embodiment, the vehicle includes a connector cord that is configured to be coupled directly to an outlet, such as outlet 224 (shown in FIG. 2) for receiving power from a residential electrical system, such as residential electrical system 204 (shown in FIG. 2). Furthermore, the vehicle (not shown) also includes a charging system that is similar to charging system 101 (shown in FIG. 1) and that is configured to perform functions that are the same or similar to those described with respect to the embodiment of FIGS. 1-8.

The electric vehicle charging systems described herein overcome at least some of the limitations of known electric vehicle charging systems by providing a charging system that cooperates with an external (e.g., portable) EVSE unit to charge a battery at one of at least two different charging rates that are selectable by a user. The systems described herein also provide for the monitoring of interruptions in power supplied by a residential electrical system to the electric vehicle, wherein the interruptions are caused, for example, by circuit breaker trips. The systems described herein also provide for the implementation of a lower charging rate if a number of power interruptions are detected during a single charging session that exceeds a predefined quota. The systems described herein also provide for the implementation of a lower charging rate if a temperature of a component of the charging system is detected that is greater than a predefined limit temperature. The systems described herein also provide for the resumption of a higher charging rate if a detected excess temperature condition is resolved. The systems described herein also provide for the storage of a location of a vehicle, where a reduction in charging rate was applied. The systems described herein further provide for the implementation a reduction in charging rate, if a present location of the vehicle is determined to correspond to a previously-stored location when a charging rate reduction was applied.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 305, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

Exemplary embodiments of methods and systems for use in charging an electric vehicle are described above in detail. The methods and systems are not limited to the specific embodiments described herein, but rather, components of systems and/or actions of the method may be utilized independently and separately from other components and/or actions described herein. Each method action and each component may also be used in combination with other method actions and/or components. Although specific features of various embodiments may be shown in some drawings and not in others, this is for convenience only. Any feature of a drawing may be referenced and/or claimed in combination with any feature of any other drawing.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for use in controlling a charging system in an electric vehicle, said computing device comprising:
    a memory device;
    a global positioning system (GPS) device; and
    a processor coupled to the memory device and the GPS device, wherein the processor is configured to:
        store, in the memory device, data relating to at least one charging session of the electric vehicle;
        receive, from a user input device, at least one selection relating to at least one of a charging rate setting and a charging preference setting for controlling a charging rate at which a charger in the electric vehicle draws current from a power supply,
        cause the charging system, during a charging session, to change a rate at which the charger in the electric vehicle draws power from a power supply from a first rate to a second, lower rate if the processor detects a predefined condition; and
        store, in the memory device, data corresponding to a detected present location of the vehicle during the charging session.

2. The computing device in accordance with claim 1, wherein said processor is configured to:
    receive data relating to detected interruptions in a power supply to which the electric vehicle is coupled; and
    cause the charging system to change a rate at which the charger in the electric vehicle draws power from the power supply from a first rate to a second, lower rate if a number of detected interruptions exceeds a predefined number of interruptions within a single charging session.

3. The computing device in accordance with claim 1, wherein the processor is configured to:
    receive data regarding a detected temperature of a component of the charging system; and
    cause the charging system to change a rate at which the charger in the electric vehicle draws power from a power supply from a first rate to a second, lower rate if a detected temperature of the charging system component exceeds a predefined limit temperature.

4. The computing device in accordance with claim 3, wherein the processor is configured to cause the charging system to restore the rate at which the charger draws power to the elevated rate if the detected temperature drops below a predefined limit temperature.

5. The computing device in accordance with claim 1, wherein the predefined condition is at least one of an occurrence of a predefined number of interruptions of a power supply to which the vehicle is coupled during a single charging session, and an occurrence of a detected temperature in a component of the charging system that exceeds a predefined limit temperature.

6. The computing device in accordance with claim 1, wherein the processor is configured to:
    receive data representing a detected present location of the vehicle during a present charging session;
    compare the detected present location data to data stored in the memory device corresponding to a previously-detected location of the vehicle during a prior charging session, during which a change from a first rate to a second, lower rate was applied by the charging system in response to a predefined condition detected by the processor; and
    cause the charging system to change a rate at which the charger in the electric vehicle draws power from a power supply from a first rate to a second, lower rate if the detected present location is the same as the previously-detected location.

7. The computing device in accordance with claim 6, wherein the processor is configured to change the rate at which the charger in the electric vehicle draws power to a rate that is no greater than a rate to which charging was reduced during the prior charging session.

8. A vehicle comprising:
a propulsion system including an electricity-oriented prime mover; and
a charging system coupled to the propulsion system and coupleable to a residential electrical system, wherein the charging system comprises:
a charger;
at least one sensor coupled to the charger; and
a computing device coupled to the charger and the at least one sensor, wherein the computing device comprises:
a memory device;
a global positioning system (GPS) device; and
a processor coupled to the memory device and the GPS device, wherein the processor is configured to cause the charging system, during a charging session, to change a rate at which the charger draws power from a power supply from a first rate to a second, lower rate if the processor detects a predefined condition, and store, in the memory device, data corresponding to a detected present location of the vehicle during the charging session.

9. The vehicle in accordance with claim 8, wherein the processor is configured to store, in the memory device, data relating to at least one charging session of the vehicle.

10. The vehicle in accordance with claim 9, wherein the processor is configured to:
store received data relating to detected interruptions in a power supply to which the electric vehicle is coupled; and
cause the charging system to change a rate at which the charger draws power from the power supply from a first rate to a second, lower rate if a number of detected interruptions during a single charging session exceeds a predefined number of interruptions.

11. The vehicle in accordance with claim 8, wherein the processor is configured to:
store received data regarding a detected temperature of a component of the charging system; and
cause the charging system to change a rate at which the charger draws power from a power supply from a first rate to a second, lower rate if the detected temperature of the charging system component exceeds a predefined limit temperature.

12. The vehicle in accordance with claim 9, wherein the processor is configured to:
receive data representing a detected present location of the vehicle during a present charging session;
compare the detected present location data to data stored in the memory device corresponding to a previously-detected location of the vehicle during a prior charging session when a change from a first rate to a second, lower charging rate was applied by the charging system in response to a detected predefined condition; and
cause the charging system to change a rate at which the charger draws power from a power supply to the second, lower rate applied during the prior charging session, if the detected present location is the same as the previously-detected location.

13. An electric vehicle supply equipment (EVSE) unit comprising:
a user input device;
a user display device;
a memory device;
a global positioning system (GPS) device; and
a processor coupled to the user input device, the user display device, the memory device, and the GPS device, wherein the processor is configured to:
store, in the memory device, data relating to at least one charging session of the electric vehicle;
receive, from the user input device, at least one selection relating to at least one of a charging rate setting and a charging preference setting for controlling a charging rate at which power from a power supply external to said EVSE unit is channeled to a charger in the electric vehicle;
cause said EVSE unit, during a charging session, to change a rate at which said EVSE unit channels power from the power supply to the charger from a first rate to a second, lower rate if the processor detects a predefined condition; and
store, in the memory device, data corresponding to a detected present location of the EVSE unit during the charging session.

14. The EVSE unit in accordance with claim 13, wherein said EVSE unit comprises:
a first connector for coupling said EVSE unit to the electric vehicle; and
a second connector for coupling said EVSE unit to the power supply.

15. The EVSE unit in accordance with claim 13, wherein the predefined condition is at least one of an occurrence of a predefined number of interruptions of a power supply to which said EVSE unit is coupled during a single charging session, and an occurrence of a detected temperature in a component of a charging system within the electric vehicle that exceeds a predefined limit temperature.

16. A computing device for use in controlling a charging system in an electric vehicle, said computing device comprising:
a memory device; and
a processor coupled to the memory device, wherein the processor is configured to:
store, in the memory device, data relating to at least one charging session of the electric vehicle;
receive, from a user input device, at least one selection relating to at least one of a charging rate setting and a charging preference setting for controlling a charging rate at which a charger in the electric vehicle draws current from a power supply,
receive data relating to detected interruptions in a power supply to which the electric vehicle is coupled; and
cause the charging system to change a rate at which the charger in the electric vehicle draws power from the power supply from a first rate to a second, lower rate if a number of detected interruptions exceeds a predefined number of interruptions within a single charging session.

* * * * *